United States Patent [19]
Oshikiri

[11] Patent Number: 5,272,565
[45] Date of Patent: Dec. 21, 1993

[54] COMPACT ZOOM LENS SYSTEM
[75] Inventor: Minoru Oshikiri, Tokyo, Japan
[73] Assignee: Olympus Optical Co., Ltd., Tokyo, Japan
[21] Appl. No.: 994,496
[22] Filed: Dec. 21, 1992
[30] Foreign Application Priority Data
  Dec. 20, 1991 [JP] Japan .................. 3-338776
[51] Int. Cl.⁵ ............... G02B 17/00; G02B 9/58
[52] U.S. Cl. ................... 359/682; 359/726; 359/735; 359/785; 359/791
[58] Field of Search ......... 359/676, 682, 689, 726, 359/735, 753, 785, 791

[56] References Cited
U.S. PATENT DOCUMENTS

| | | | |
|---|---|---|---|
| 3,620,602 | 11/1971 | Kawazu | 359/726 |
| 3,649,101 | 3/1972 | Straw et al. | 359/726 |
| 3,658,411 | 4/1972 | Price | 359/726 |
| 4,249,798 | 2/1981 | Moskovich | 359/726 |
| 4,614,409 | 9/1986 | Sakai | 359/726 |
| 4,707,103 | 11/1987 | Ikemori et al. | 354/403 |
| 4,730,199 | 3/1988 | Ikemori et al. | 354/152 |
| 4,731,527 | 3/1988 | Nomura et al. | 359/726 |
| 4,838,668 | 6/1989 | Betensky et al. | 359/689 |

Primary Examiner—Bruce Y. Arnold
Assistant Examiner—Evelyn A. Lester
Attorney, Agent, or Firm—Cushman, Darby & Cushman

[57] ABSTRACT

The invention provides a compact zoom lens system which has an angular coverage from wide angle to moderate telephoto and makes a relatively bright and parallax-free TTL finder possible and in which a first unit 11 having a positive power as a whole is located on the side proximate to the object. The lens system includes a reflective means 13c located more closely to the image side than the first unit 11 for guiding incident light to a finder subsystem and a movable lens unit that moves for zooming. The movable lens unit comprises a sub-unit 13a having a positive power as a whole and located on the object side of the reflective means 13c and a sub-unit 13b having a negative power as a whole and located on the images side of the reflective means 13c, or alternatively a sub-unit having a negative power as a whole and located on the object side of the reflective means and a sub-unit having a positive power as a whole and located on the image side of the reflective means. The movable lens unit has an aperture stop located therein or adjacent thereto.

7 Claims, 11 Drawing Sheets

COMPACT ZOOM LENS SYSTEM

BACKGROUND OF THE INVENTION

The present invention relates generally to a taking zoom lens system, and more particularly to a compact zoom lens system designed to be used on 35-mm silver salt cameras.

Conventional zoom lens systems known so far for use on 35-mm silver salt cameras are broken down into two types, one designed for a single-lens reflex camera such that light passing through a taking lens is guided to a finder subsystem, using reflective means such as a quick return mirror or half mirror attached to the rearmost end of the zoom lens system and the other for a zoom compact camera such that an optical subsystem used for a finder alone is used independently of a taking lens.

The first-mentioned type system for a single-lens reflex camera enables an image approximate to an actual image on film to be confirmed through a finder subsystem, because the finder subsystem makes use of light passing through a taking lens. In particular, this system has an advantage that parallax can be compensated completely. However, some space is needed for inserting an optical path-splitting reflective means into the rearmost end of the zoom lens system, as mentioned above. In the case of a currently available system using a quick return mirror in particular, an extra space for mirror movement and retraction is required in addition to that needed for passing rays therethrough. More illustratively, a 35-mm single-lens reflex camera is required to have an air space of usually about 38 to 40 mm on the final lens surface. This constitutes one of grave barriers on reducing the length from the foremost end to film surface of the zoom lens system.

In the second-mentioned compact camera type of zoom lens system in which the finder subsystem is independent from the taking lens, there is no need of inserting an optical path-splitting reflective means into the rearmost end of the lens system, unlike the single-lens reflex camera system mentioned above; in other words, it is possible to reduce the length of the taking lens. However, it is deprived of the merit that an image approximate to an actual image on film can be confirmed through the finder subsystem. Of course, this merit is among those of the single-lens reflex camera system. In particular, a severe demerit is the occurrence of parallax.

In order to prevent the occurrence of parallax and thereby provide a solution to the problems mentioned above, zoom lens systems in which the initial portion of the finder subsystem passes through the taking lens have so far been known from JP-A-61-114217 and U.S. Pat. No. 4,838,668.

However, the system disclosed in JP-A-61-114217 makes no appreciable contribution to compactness, because the beam splitter that defines an optical path-splitting means remains fixed and the subsequent lens units again remain fixed; in precise parlance, the zooming action of the zoom lens is born by a space located therein, that has so far been located at the rearmost end of the taking lens, rather than by the lens units located subsequent to the beam splitter. As disclosed in the first example of JP-A-114217, the lens length at the focal length at the wide angle end is indeed 125 mm with a zoom ratio falling short of 3. Thus, the system is in no sense said to be made compact.

The system set forth in U.S. Pat. No. 4,838,668, on the other hand, has a well-enough zoom ratio of 3 to 4 and is made compact in a sense of the shortest lens length being 101 to 115 mm. Since the focal length is located on the wide angle side, however, the focal length at the telephoto end is 95 to 116 mm, and this is insufficient for lenses for moderate telephoto to which general users prefer. This is because the system lends itself suitable for wide angle zooming starting with a first lens unit that is of negative power. For this reason, the system referred to in the example of this specification is satisfactory in terms of the wide angle image-formation performance, but is dark at the telephoto end, as expressed by an F-number of 6 or more and is less than satisfactory in terms of the image-formation performance, especially spherical aberration and coma.

SUMMARY OF THE INVENTION

In view of such situations mentioned above and in order to provide a solution to such problems as mentioned above, the invention has for its object to provide a compact zoom lens system which has an angular coverage from wide angle to moderate telephoto and makes a relatively bright and parallax-free TTL finder possible.

In accordance with the invention, the object mentioned above is achieved by the provision of a compact zoom lens system comprising:

a first lens unit located on the side proximate to the object and having a positive power as a whole, a reflective means located more closely to the image side than said first lens unit and designed for guiding a part of light passing through said first lens unit to a finder subsystem, a front sub-lens unit located more closely to the image side than said first lens unit and on the object side of said reflective means, and a rear sub-lens unit located more closely to the image side than said reflective means, (a) said front sub-lens unit having a positive power as a whole and said rear sub-lens unit having a negative power as a whole, or alternatively said front sub-lens unit having a negative power as a whole and said rear sub-lens unit having a positive power as a whole, (b) said front sub-lens unit and said rear sub-lens unit forming a movable lens unit that moves for zooming, and said front sub-lens unit, said reflective means and said rear sub-lens unit moving on the optical axis from the wide angle to telephoto end, and (c) said movable lens unit having an aperture stop located therein or adjacent thereto.

Another compact zoom lens system of the invention comprises:

a first lens unit located on the side proximate to the object and having a positive power as a whole, a reflective means located more closely to the image side than said first lens unit and designed for guiding a part of light passing through said first lens unit to a finder subsystem, a front sub-lens unit located more closely to the image side than said first lens unit and on the object side of said reflective means, and a rear sub-lens unit located more closely to the image side than said reflective means, (a) said front sub-lens unit having a positive power as a whole and said rear sub-lens unit having a negative power as a whole, or alternatively said front sub-lens unit having a negative power as a whole and said rear sub-lens unit having a positive power as a whole, (b) said front sub-lens unit and said rear sub-lens unit forming a movable lens unit that moves for zooming, and said front sub-lens unit, said reflective means and said rear sub-lens unit moving as an integral piece for wide angle to telephoto zooming, and (c) said movable lens unit having an aperture stop located therein or adjacent thereto.

According to the invention, the zoom lens system at least includes, in order from the object side, a first lens unit of positive power, a second lens unit of negative power and a third lens unit of positive power and is designed such that at least said third lens unit is moved from the image surface to object side for wide angle to telephoto zooming, said third lens unit being divided into a positive, front sub-lens unit and a negative, rear sub-lens unit in order from the object side, between which there is located a reflective means for guiding light incident on said zoom lens system to a finder subsystem, and said third lens unit having an aperture stop located therein or adjacent thereto.

Alternatively, the zoom lens system of the invention at least includes, in order from the object side, a first lens unit of positive power, a second lens unit of positive power and a third lens unit of negative power and is designed such that at least said second lens unit is moved from the image surface to object side for wide angle to telephoto zooming, said second lens unit being divided into a negative, front sub-lens unit and a positive, rear sub-lens unit in order from the object side, between which there is located a reflective means for guiding light incident on said zoom lens system to a finder subsystem, and said second lens unit having an aperture stop located therein or adjacent thereto.

In the ensuing description, reference will now be made to why such constructions mentioned above are adopted and how they act.

The first lens unit having a positive power as a whole is located proximate to the object side for converging on-axial rays, so that the heights of on-axial marginal rays passing through the lenses located more closely to the image surface than the first lens unit can be lowered. In particular, this effect becomes remarkable in the vicinity of the longest focal length and the aperture stop. Lowering the heights of rays in the vicinity of the aperture stop is also effective for the location of the reflective means for guiding light to the finder subsystem on the movable unit in the vicinity of the aperture stop—that is one of the characteristic features of the invention, because the reflective means can be reduced in size and produce some large effect. Moreover, lowering the heights of on-axial marginal rays in the vicinity of the aperture stop is important for increasing the longest focal length and thereby making bright the F-number at the longest focal length, and this is also well effective for preventing the occurrence of spherical aberration and coma.

In order to reduce the shortest overall length of the zoom lens system of the invention, the reflective means is preferably disposed within the movable unit located more closely to the image surface side than the first lens unit, thereby reducing the distance from the rearmost surface of the zoom lens system to the film surface. In this context, it is noted that such a reflective means has so far been attached to the rear most end of a single-lens reflex camera.

Where is best-suited for locating the reflective means in view of reducing the size of the reflective means is a site on which bundles of rays concentrate. In the invention, the reflective means is therefore located in the vicinity of the aperture stop.

In order to lower the heights of rays contained in the bundle of off-axial rays, the movable unit should preferably be constructed from a sub-unit having a positive power as a whole and a sub-unit having a negative power as a whole, between which the reflective means is sandwiched, as shown in FIGS. 11(a) and 11(b). FIG. 11(a) is a schematic view showing an arrangement where in a movable unit a0 including a reflective means a3, sub-units a1 and a2 of positive and negative powers are located on the object and image surface sides, respectively. As can be best seen from this drawing, a bundle of rays a4 is incident on the sub-unit a1 of positive power, reflected in the optical direction and passed through the reflective means a3, so that the heights of such rays can be lowered to reduce the required size of the reflective means a3. FIG. 11(b) schematically represents an arrangement where in a movable unit b0 including a reflective means b3, sub-units b1 and b2 of negative and positive powers are located on the object and image surface sides, respectively. As can be seen from this drawing, a bundle of off-axial rays b4 having the required field angle is attracted by the sub-unit b1 of negative power in the optical axis direction on the movable unit-incident side, whereby the heights of the rays passing the reflective means b3 in the movable unit can be lowered to reduce the required size of the reflective means b3. Such a sub-unit arrangement of positive and negative powers as shown in FIG. 11(a) is favorable for increasing the zoom ratio of a zoom lens system, because when the front principal point of the movable unit is positioned forward and reduces in the spacing with respect to the sub-unit of the movable unit positioned just in front of the object side where the zoom lens system is in a long-focus state, it can be moved more closely to the sub-unit of the movable unit located just in front of the object side than the actual air spacing. On the contrary, such a sub-unit arrangement of negative and positive powers as shown in FIG. 11(b) is advantageous for increasing the zoom ratio of the zoom lens system, because when the rear principal point of the movable unit is positioned rearward and the spacing of the movable unit with the unit positioned just in the rear of the image side reduces where the zoom lens system is in a long-focus state, it can be moved more closely to the unit just in the rear of the image side than the actual air space.

In order to achieve the best effect both on extending the longest focal length mentioned above and thereby reducing the F-number (or, in another parlance, making the lens system bright) and on making the zoom lens system compact, the zoom lens system of the invention should conform to the following formulae (1) and (2):

$$0.8 < F_T/F_1 < 2.5 \tag{1},$$

and $$4 < F_T F_R < 8 \tag{2}.$$

Here $F_T$ is the longest focal length of the zoom lens system, $F_R$ is the focal length of the movable unit including the reflective means, and $F_1$ is the focal length of the first lens unit.

Below the lower limit of Formula (1) there is a lowering of the converging action of the first lens unit, rendering it impossible to make the zoom lens system compact. Above the upper limit of Formula (1), on the other hand, excessive aberrations occur, so that too large loads are placed on the correction of them by the subsequent lens units.

Formula (2) reveals that the power of the movable unit can be made stronger than conventional. This is because the first lens unit of the zoom lens system is of positive power so that the heights of rays passing through the movable unit can be lowered. Some deviation from the lower limit of Formula (2) is acceptable, but the quantity of movement of the movable unit becomes too large to achieve compactness. Some deviation from the upper limit of Formula (2), on the other hand, causes excessive aberrations to occur, leading to a performance lowering.

More illustratively, the zoom lens system of the invention at least includes, in order from the object side, a first lens unit of positive power, a second lens unit of negative power and a third lens unit of positive power and is designed such that at least the third lens unit is moved from the image surface to object side for short-focus to long-focus zooming, said third lens unit being divided into a positive sub-unit and a negative sub-unit in order from the object side, between which there is located a reflective means for guiding rays incident on the zoom lens system to the finder subsystem. In order to provide a space for the insertion of the reflective means and reduce the back focus for compactness, the zoom lens system should preferably conform to the following formulae (3) and (4):

$$4 < F_T/F_{RP1} < 8 \tag{3}$$

and $$-7 < F_T/F_{RN1} < -3 \tag{4}$$

Here $F_{RP1}$ is the focal length of the positive sub-unit in the third lens unit, and $F_{RN1}$ is the focal length of the negative sub-unit in the third lens unit.

Formula (3) defines a range that is effective for reducing a space for the insertion of the reflective means, thereby lowering the heights of off-axial rays passing through the reflective means. Below the lower limit of Formula (3) the effect becomes slender, whereas above the upper limit of Formula (3) the power becomes so strong that excessive aberrations occur.

Again, Formula (4) defines a range that is effective for the insertion of the reflective means and reducing the back focus. Above the upper limit of Formula (4) there are an increase in the space for the insertion of the reflective means and an extension of the back focus as well, rendering compactness unachievable. Below the lower limit of Formula (4) the power becomes so strong that excessive aberrations occur.

A further illustrative zoom lens system of the invention at least includes, in order from the object side, a first lens unit of positive power, a second lens unit of positive power and a third lens unit of negative power and is designed such that at least the second lens unit is moved from the image surface to object side for short-focus to long-focus zooming, said second lens unit being divided into a negative sub-unit and a positive sub-unit in order from the object side, between which there is located a reflective means for guiding light incident on the zoom lens system to a finder subsystem. Here it is noted that, in order to provide a space for the insertion of the reflective means and reduce the back focus for achieving compactness, the lens unit arrangement mentioned above should desirously conform to the following formulae (5), (6) and (7):

$$0.5 < |F_T/F_{RN2}| < 2 \tag{5}$$

$$3 < F_T/F_{RP2} < 5 \tag{6}$$

and $$-7 < F_T/F_3 < -3 \tag{7}$$

Here $F_{RN2}$ is the focal length of the negative sub-unit in the second lens unit, $F_{RP2}$ is the focal length of the positive sub-unit in the second lens unit, and $F_3$ is the focal length of the third lens unit.

Formulae (5) and (6) define a range that is effective for lowering the heights of off-axial rays passing through the reflective means, thereby reducing the space for the insertion thereof. Below the lower limits of Formulae (5) and (6) the effect achieved becomes slender, whereas above the upper limits of Formulae (5) and (6) the power becomes so strong that excessive aberrations occur.

Again, Formula (7) defines a range that is effective for reducing the back focus and thereby achieving compactness. Above the upper limit of Formula (7) any sufficient reduction in the back focus is unachievable, whereas below the lower limit of Formula (7) the power becomes so strong that excessive aberrations occur.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following description, Examples 1 to 5 of the compact zoom lens system of the invention will be explained, by way of example and not by way of limitation, with reference to the accompanying drawings.

It is noted that the lens data of each example will be given later.

Figure 1:
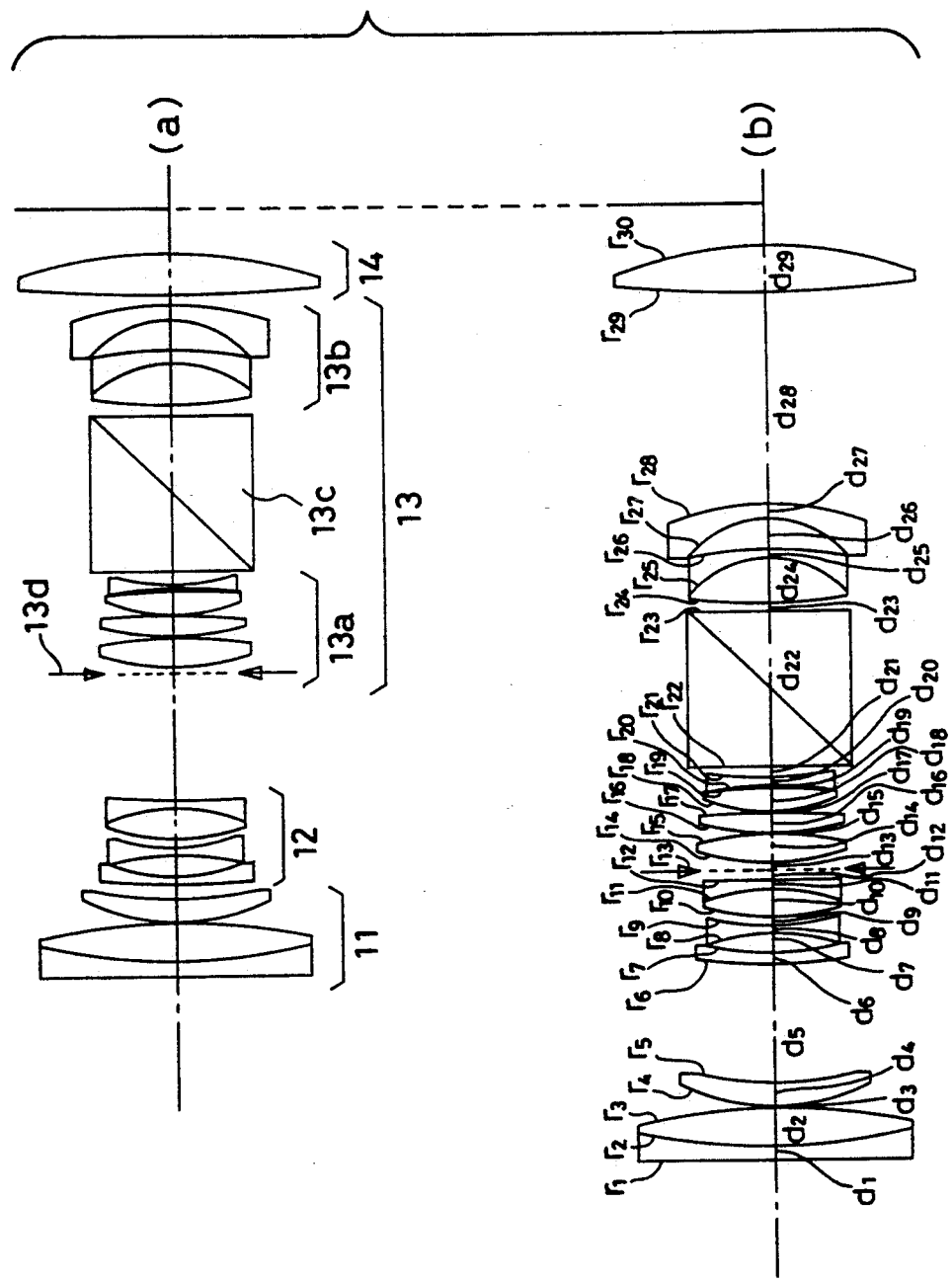
FIG. 1 is a sectional representation of the lens arrangement of Example 1 of the compact zoom lens system of the invention at the (a) wide angle and (b) telephoto ends.
Figure 6:
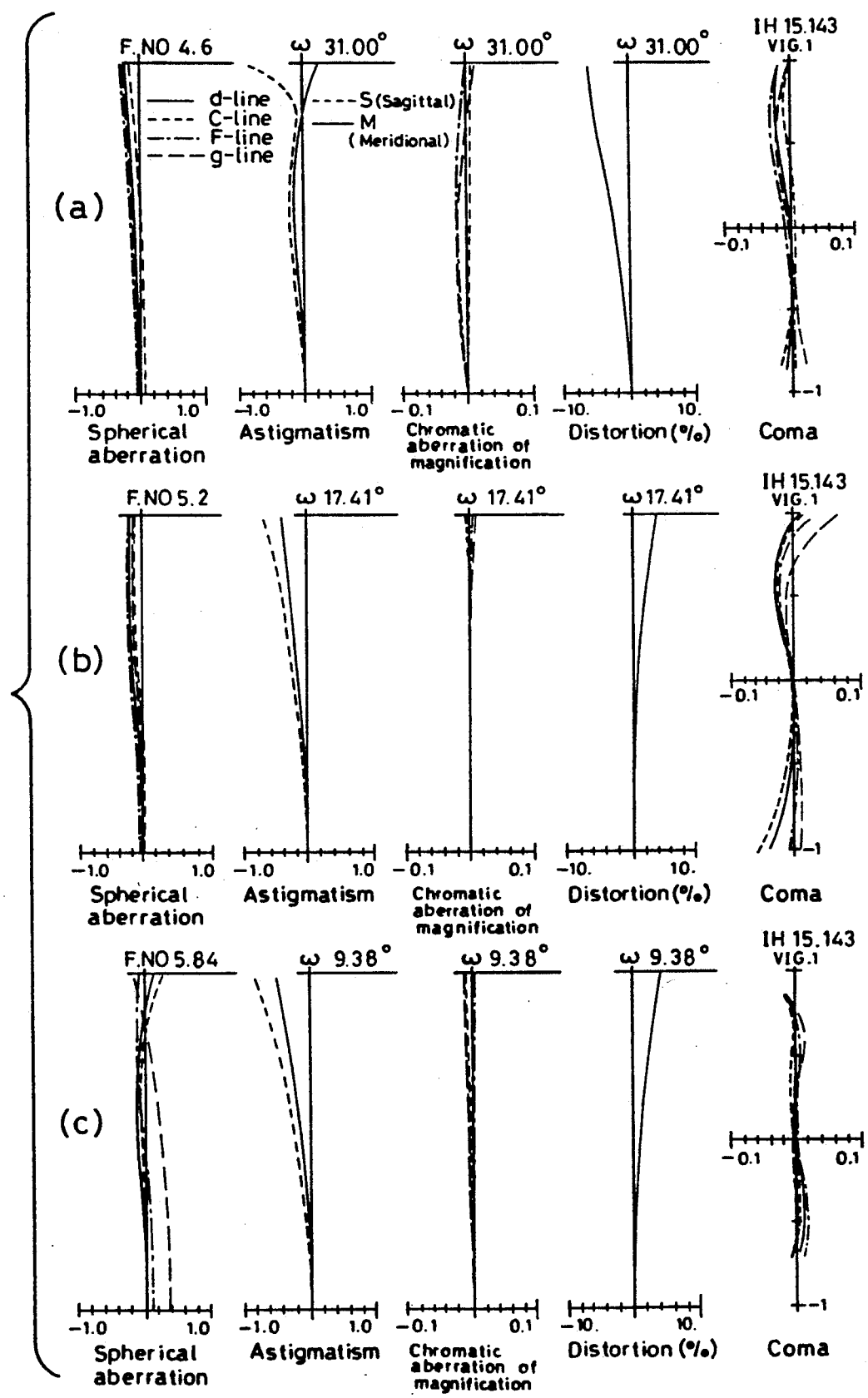
FIG. 6 is an aberration diagram showing spherical aberration, astigmatism, chromatic aberration of magnification, distortion and coma at $-1/50x$ of Example 1 at the (a) wide angle end, (b) standard setting and (c) telephoto end.

Referring first to FIG. 1 that is a sectional representation of the lens arrangement of Example 1 at the (a) wide angle and (b) telephoto ends, it comprises a first lens unit 11 of positive power, a second lens unit 12 of negative power, a third lens unit 13 of positive power and a fourth lens unit 14 of positive power. For zooming from the short-focus to long-focus side, the first, second and third lens units 11, 12 and 13 are moved together from the image surface to object side, while the fourth lens 14 remains fixed. The third lens unit 13 comprises, in order from the object side, an aperture stop 13d, a positive sub-unit 13a, a beam splitter 13c for splitting the optical path into a finder and a negative sub-unit 13b. The positive first lens unit 11 serves to lower the heights of on-axial marginal rays through the second (12) and subsequent units at the telephoto end, The third lens unit 13 serves to use the positive sub-unit 13a to lower the heights of off-axial rays passing through the beam splitter 13c, thereby reducing the size of the beam splitter 13c, and use the negative sub-unit 13b to correct the focal length as desired. This arrangement comprising the positive and negative sub-units 13a and 13b enables the front principal point of the third unit 13 to be positioned forward, thereby achieving a high zoom ratio at the longest focal position. It is understood that focusing is done by extending the first and second units 11 and 12 together. Shown in FIG. 6 is an aberration diagram showing spherical aberration, astigmatism, chromatic aberration of magnification, distortion and coma at −1/50x of Example 1 at the (a) wide angle end, (b) standard setting and (c) telephoto end.

As can be seen from the lens data, given later, and the aberration diagram, the zoom lens system of Example 1 has a zoom ratio of 3.64 and a longest focal length of 131 mm with an F-number of 5.84 but, nonetheless, is compact, as indicated by 105 mm in the shortest overall length and as short as 26.7 mm in the quantity of movement of the first lens unit, and shows well-enough performance as well.

Figure 2:
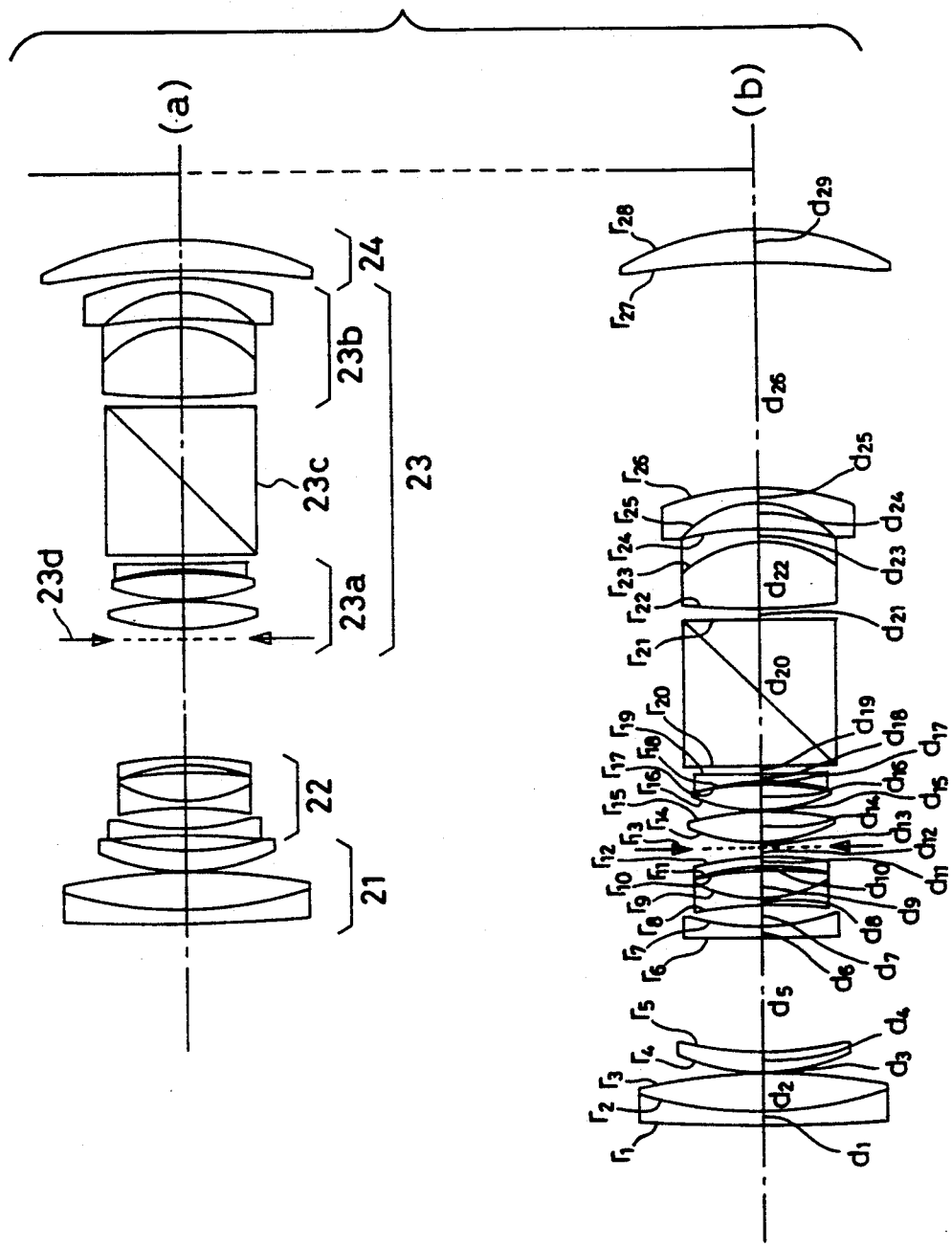
FIG. 2 is a view of Example 2 that is similar to FIG. 1
Figure 7:
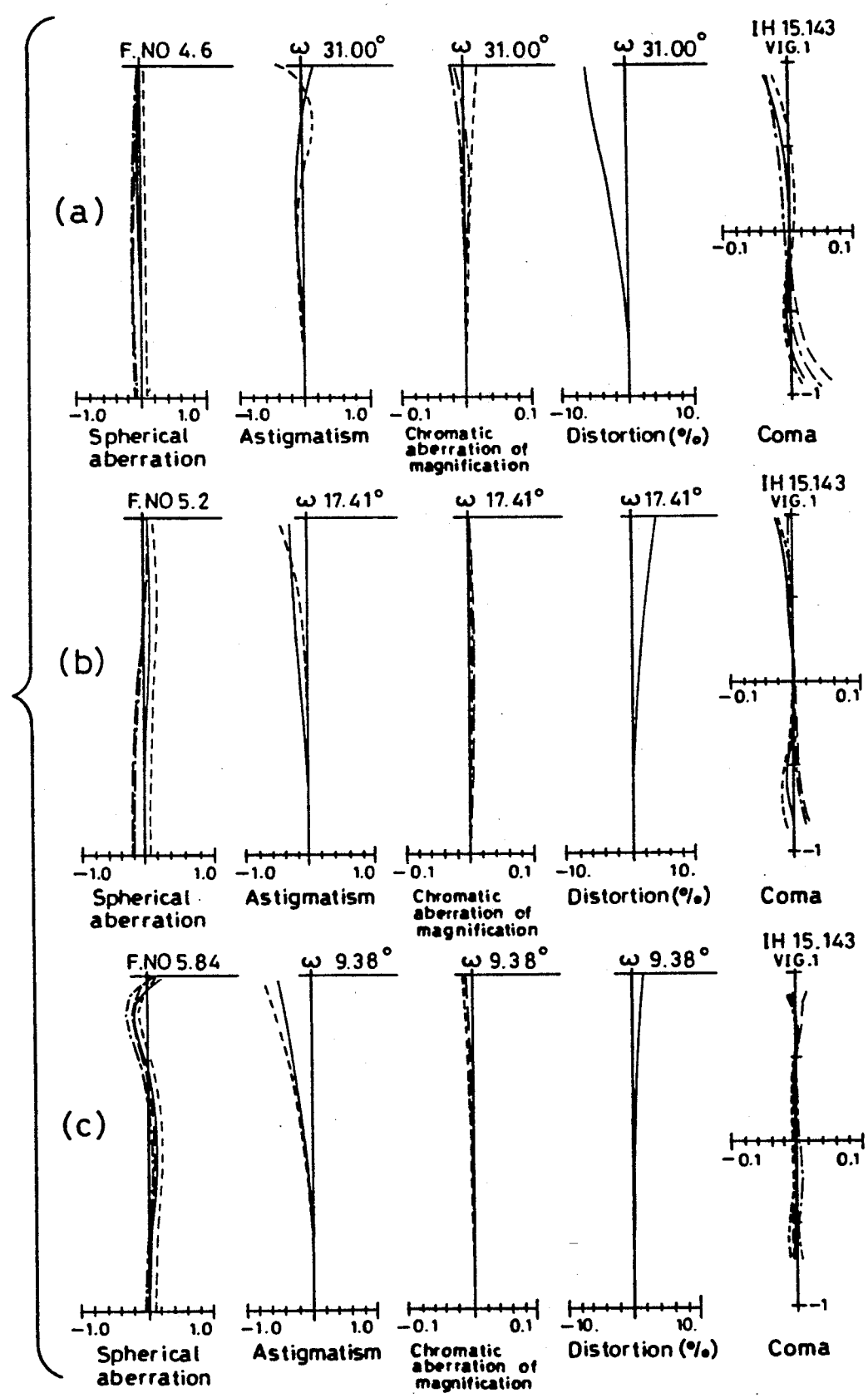
FIG. 7 is a view of Example 2 that is similar to FIG. 6.

Reference will be made to Example 2, the lens arrangement of which is shown in section at the (a) wide angle and (b) telephoto ends in FIG. 2. The lens unit system comprises, in order from the object side, a first lens unit 21 of positive power, a second lens unit 22 of negative power, a third lens unit 23 of positive power and a fourth lens unit 24 of positive power. For zooming from the short-focus to long-focus side, the first, second and third units 21, 22 and 23 are moved together from the image surface to object side, while the fourth unit 24 remains fixed. The third lens unit 23 comprises, in order from the object side, an aperture stop 23d, a positive sub-unit 23a, a beam splitter 23c for splitting the optical path into a finder and a negative sub-unit 23b. Used with the positive sub-unit 23a of the third unit 23 is an aspherical lens. It is understood that focusing is done by extending the first and second units 21 and 22 together. Shown in FIG. 7 is an aberration diagram showing spherical aberration, astigmatism, chromatic aberration of magnification, distortion and coma at −1/50x of Example 2 at the (a) wide angle end, (b) standard setting and (c) telephoto end.

As can be seen from the lens data, given later, and the aberration diagram, the zoom lens system of Example 2 has a zoom ratio of 3.64 and a longest focal length of 131 mm with an F-number of 5.84 but, nonetheless, is compact, as indicated by 105 mm in the shortest overall length and as short as 30.0 mm in the quantity of movement of the first lens unit, and shows well-enough performance as well.

Figure 3:
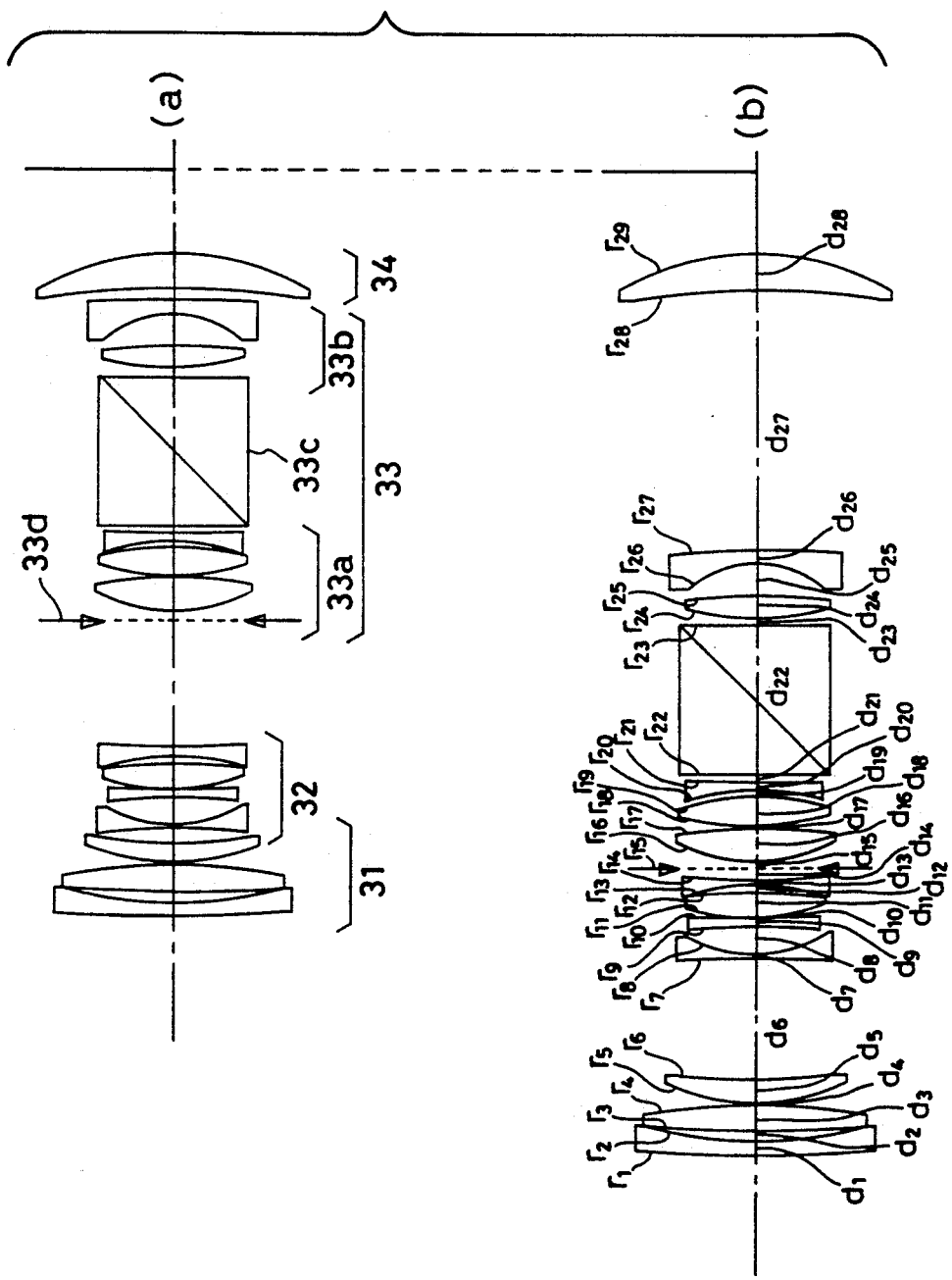
FIG. 3 is a view of Example 3 that is similar to FIG. 1.
Figure 8:
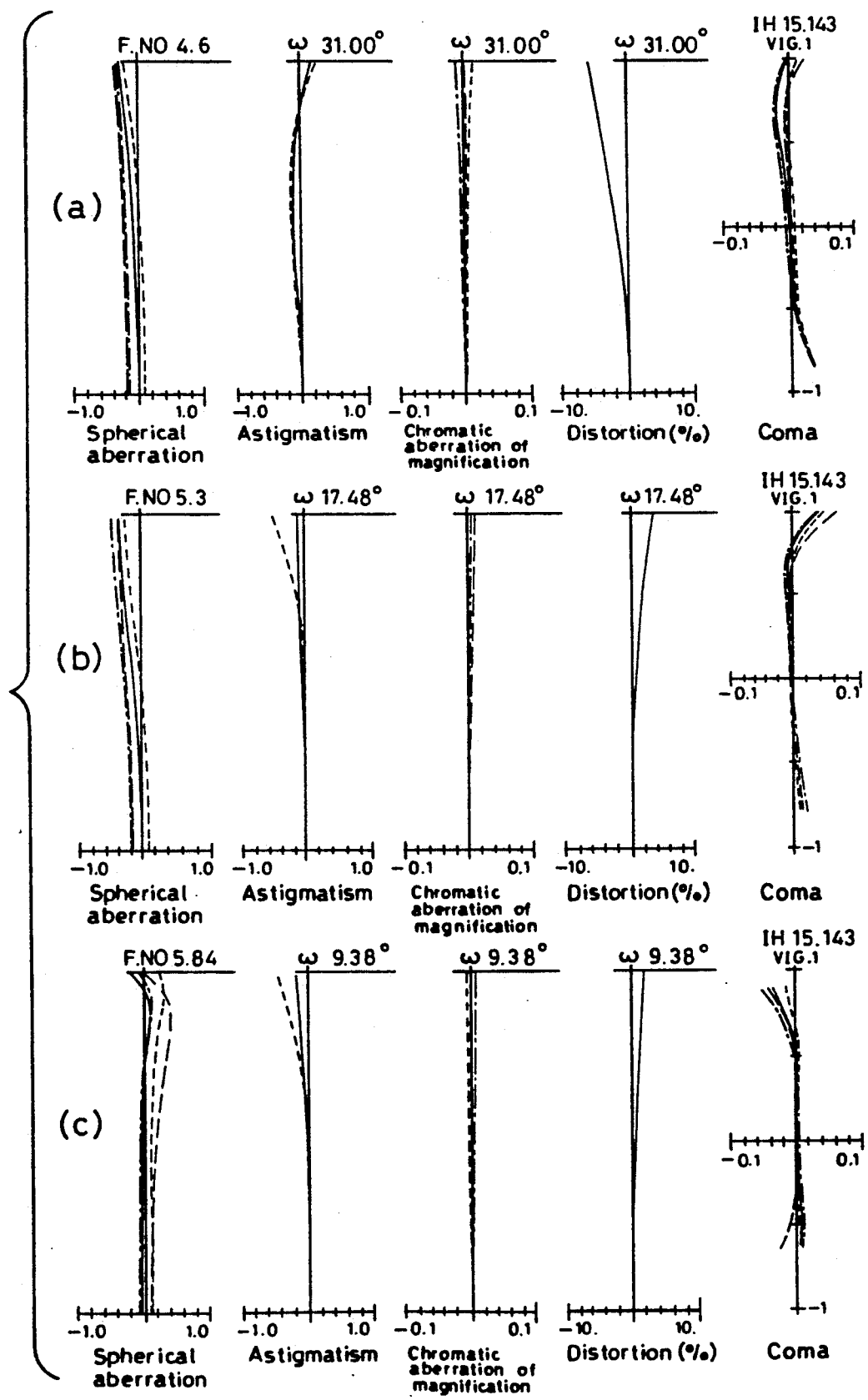
FIG. 8 is a view of Example 3 that is similar to FIG. 6.

Reference will be made to Example 3, the lens arrangement of which is shown in section at the (a) wide angle and (b) telephoto ends in FIG. 3. The lens unit system comprises, in order from the object side, a first lens unit 31 of positive power, a second lens unit 32 of negative power, a third lens unit 33 of positive power and a fourth lens unit 34 of positive power. For zooming from the short-focus to long-focus side, the first, second and third units 31, 32 and 33 are moved together from the image surface to object side, while the fourth unit 34 remains fixed. The third lens unit 33 comprises, in order from the object side, an aperture stop 33d, a positive sub-unit 33a, a beam splitter 33c for splitting the optical path into a finder and a negative sub-unit 33b. Used with the positive sub-unit 33a of the third unit 33 is an aspherical surface and used with the negative sub-unit 33b of the third unit 33 is an aspherical surface. It is understood that focusing is done by extending the first and second units 31 and 32 together. Shown in FIG. 8 is an aberration diagram showing spherical aberration, astigmatism, chromatic aberration of magnification, distortion and coma at −1/50x of Example 2 at the (a) wide angle end, (b) standard setting and (c) telephoto end.

As can be seen from the lens data, given later, and the aberration diagram as well, the zoom lens system of Example 3 has a zoom ratio of 3.64 and a longest focal length of 131 mm with an F-number of 5.84 and comprises no more than 13 lenses but, nonetheless, is compact, as indicated by 105 mm in the shortest overall length and as short as 33.9 mm in the quantity of movement of the first lens unit, and shows well-enough performance as well.

Figure 4:
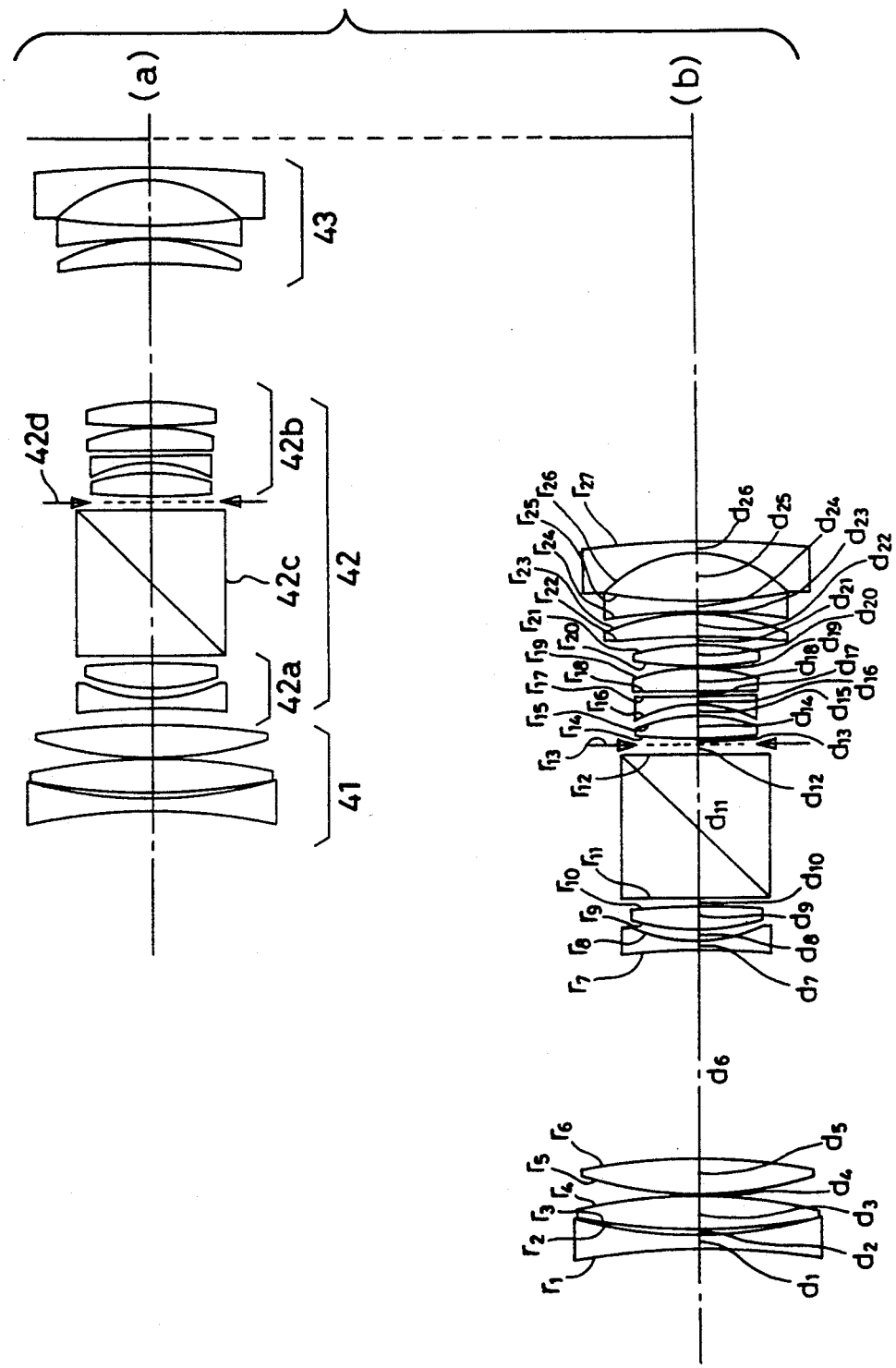
FIG. 4 is a view of Example 4 that is similar to FIG. 1.
Figure 9:
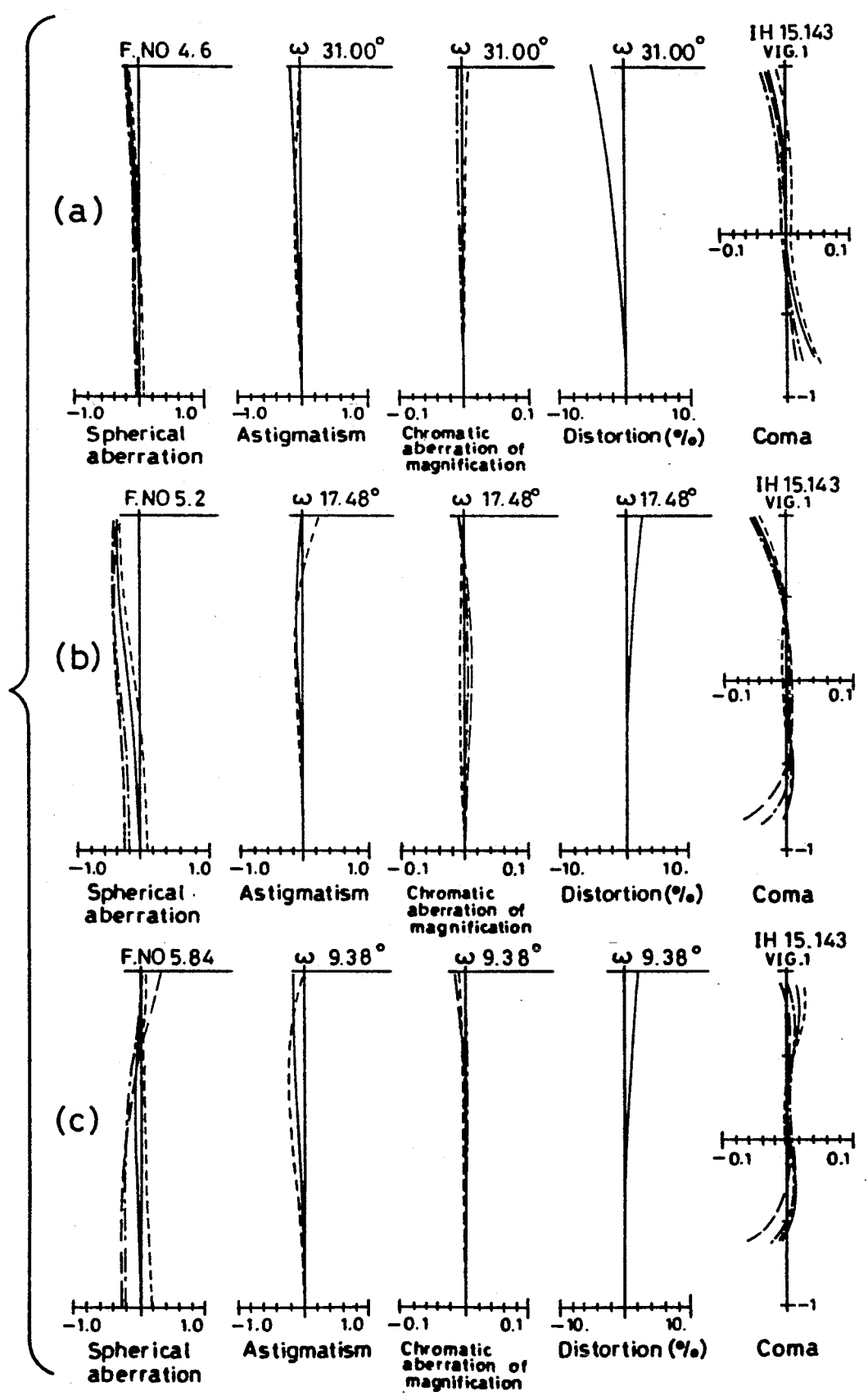
FIG. 9 is a view of Example 4 that is similar to FIG. 6.

Referring then to FIG. 4 that is a sectional representation of the lens arrangement of Example 4 at the (a) wide angle and (b) telephoto ends, it comprises a first lens unit 41 of positive power, a second lens unit 42 of positive power and a third lens unit 43 of negative power. For zooming from the short-focus to long-focus side, the first, second and third units 41, 42 and 43 are moved together from the image surface to object side. The second unit 42 comprises, in order from the object side, a negative sub-unit 42a, a beam splitter 42c for splitting the optical path into a finer, an aperture stop 42d and a positive sub-unit 42b. The positive first lens unit 41 serves to lower the heights of on-axial marginal rays through the second (42) and subsequent units a the telephoto end, preventing the occurrence of spherical aberration and coma. The second unit 42 serves to use the negative sub-unit 42a to converge off-axial rays and reduce the angles and hence heights of off-axial rays passing through the beam splitter 43c, thereby reducing the size of the beam splitter 43c. This arrangement comprising the negative and positive sub-units 43a and 43b enables the front principal point of the second unit 42 to be positioned rearward, thereby achieving a high zoom ratio on the telephoto side. It is understood that focusing is done by the inner focus of the second unit 42. Shown in FIG. 9 is an aberration diagram showing spherical aberration, astigmatism, chromatic aberration of magnification, distortion and coma at −1/50x of Example 4 at the (a) wide angle end, (b) standard setting and (c) telephoto end.

As can be seen from the lens data, given later, and the aberration diagram as well, the zoom lens system of Example 4 has a zoom ratio of 3.63 and a longest focal length of 131 mm with an F-number of 5.84 and comprises no more than 11 lenses but, nonetheless, is compact, as indicated by 101 mm in the shortest overall length and show well-enough performance as well. When the aperture stop 42d is used as a sector, a lens system for a lens shutter camera can be obtained with no need of using a focal plane shutter, leading to some cost reduction.

Figure 5:
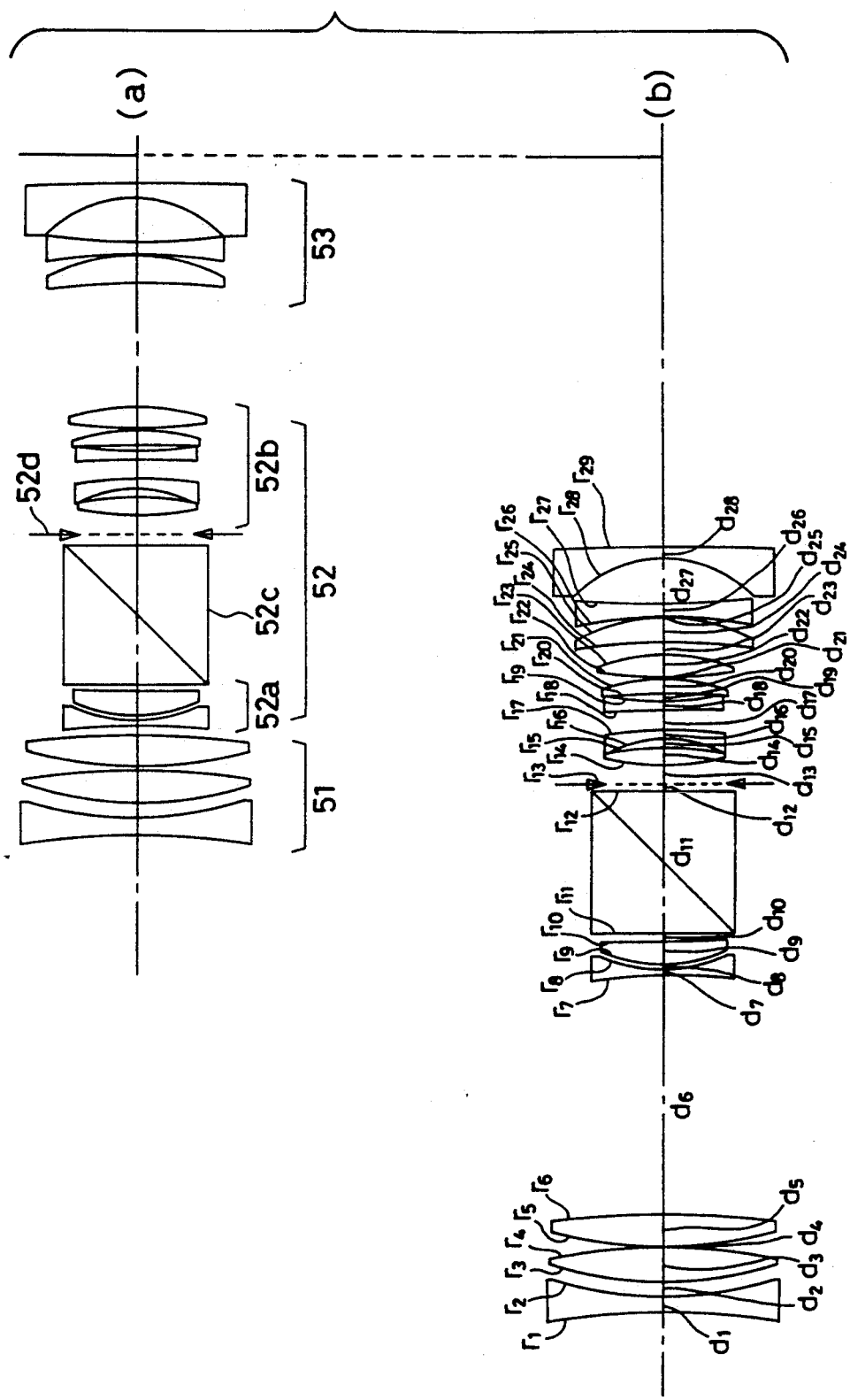
FIG. 5 is a view of Example 5 that is similar to FIG. 1.
Figure 10:
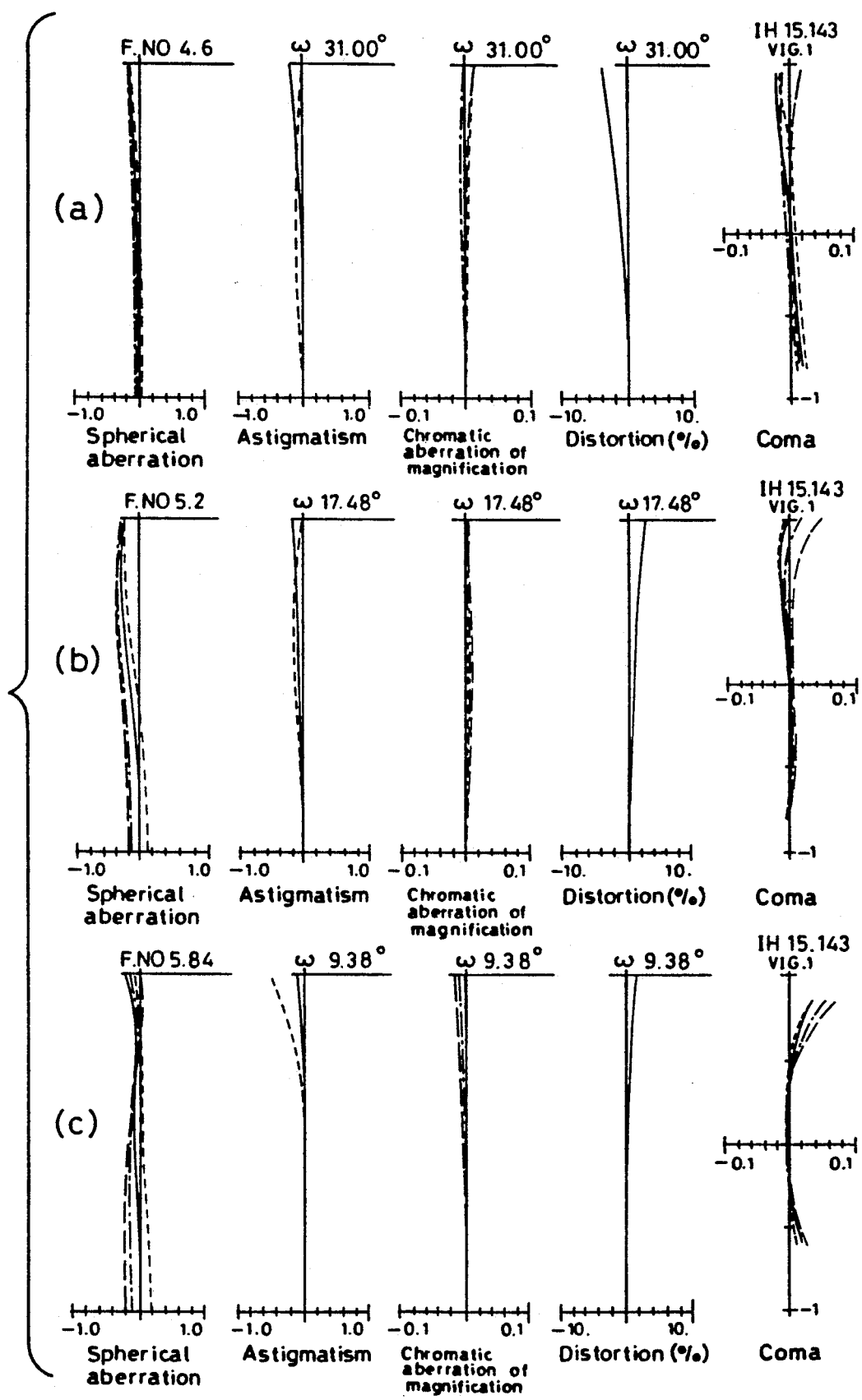
FIG. 10 is a view of Example 5 that is similar to FIG. 6.
Figure 11:
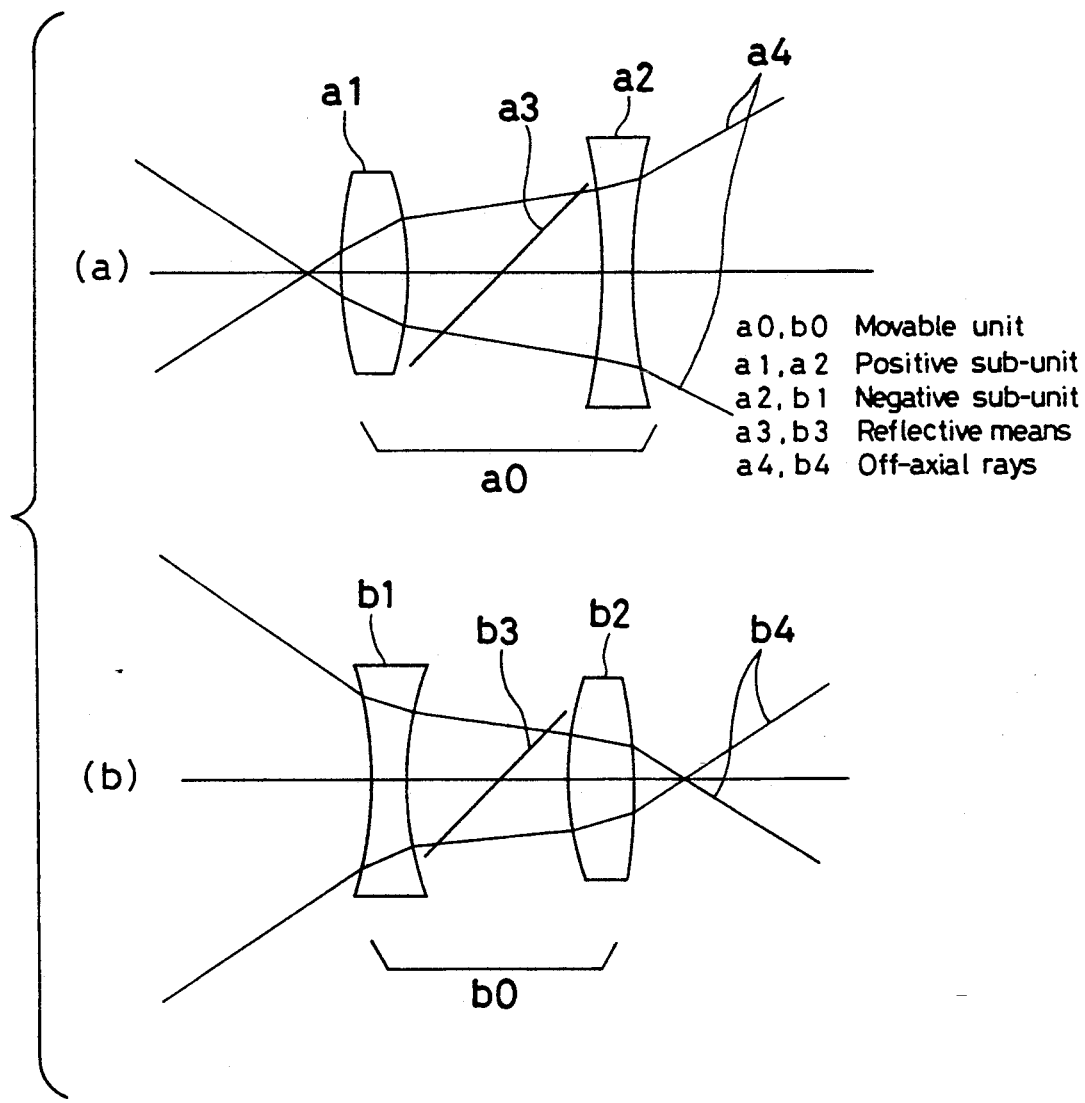
FIG. 11 is a representation illustrating the construction and action of the sub-units of the movable unit including the reflective means.

Referring finally to FIG. 5 that is a sectional representation of the lens arrangement of Example 5 at the (a) wide angle and (b) telephoto ends, it comprises a first lens unit 51 of positive power, a second lens unit 52 of positive power and a third lens unit 53 of negative power. For zooming from the short-focus to long-focus side, the first, second and third units 51, 52 and 53 are moved together from the image surface to object side. The second unit 52 comprises, in order from the object side, a negative sub-unit 52a, a beam splitter 52c for splitting the optical path into a finer, an aperture stop 52d and a positive sub-unit 52b. It is understood that focusing is done by moving the positive sub-unit 52b of the second unit 52. Shown in FIG. 10 is an aberration diagram showing spherical aberration, astigmatism, chromatic aberration of magnification, distortion and coma at −1/50x of Example 5 at the (a) wide angle end, (b) standard setting and (c) telephoto end.

As can be seen from the lens data, given later, and the aberration diagram as well, the zoom lens system of Example 5 has a zoom ratio of 3.64 and a longest focal length of 131 mm with an F-number of 5.84 and comprises no more than 12 lenses but, nonetheless, is compact, as indicated by 105 mm in the shortest overall length, and shows well-enough performance as well. When the aperture stop 52d is used as a shutter, a lens system for a lens shutter camera can be obtained with no need of using a focal plane shutter, leading to some cost reduction.

In the ensuing description, reference will be made to the lens data of each example. It is noted, however, that symbols hereinafter used but not hereinbefore mean:

f is the focal length of the overall system,
$F_{NO}$ is the F-number,
$\omega$ is the half field angle,
$f_B$ is the back focus,
$F_1$ to $F_4$ are the focal lengths of the first to fourth lens units, respectively,
$r_1, r_2, \ldots$ are the radii of curvature of the lens surfaces,
$d_1, d_2, \ldots$ are the spacings between the lens surfaces,
$A_1, A_2, \ldots$ are the effective radii of the lens surfaces,
$n_{d1}, n_{d2}, \ldots$ are the d-line refractive indices of the lenses, and
$\nu_{d1}, \nu_{d2}, \ldots$ are the Abbe's numbers of the lenses.

Now letting x denote the optical axis direction and y denote the direction normal thereto, aspherical configuration is given by $$x = (y^2/r)[1+\{1-P(y^2/r^2)\}^{\frac{1}{2}}] + A_4 y^4 + A_6 y^6 + A_8 y^8$$

where r is the paraxial radius of curvature, P is the conical coefficient, and $A_4$, $A_6$ and $A_8$ are the aspherical coefficients.

EXAMPLE 1

$f = 36.0 \sim 69.0 \sim 131.0$
$F_{NO} = 4.6 \sim 5.2 \sim 5.84$
$\omega = 31.00° \sim 17.41° \sim 9.38°$

| | | | |
|---|---|---|---|
| $r_1 = 924.3120$ | $d_1 = 2.0000$ | $A_1 = 18.705$ | $n_{d1} = 1.80518$ $\nu_{d1} = 25.43$ |
| $r_2 = 77.7283$ | $d_2 = 5.4260$ | $A_2 = 17.483$ | $n_{d2} = 1.60311$ $\nu_{d2} = 60.70$ |
| $r_3 = -86.7767$ | $d_3 = 0.1500$ | $A_3 = 16.892$ | |
| $r_4 = 30.0958$ | $d_4 = 3.2000$ | $A_4 = 12.799$ | $n_{d3} = 1.48749$ $\nu_{d3} = 70.20$ |
| $r_5 = 57.3810$ | $d_5 = $ (Variable) | $A_5 = 11.682$ | |
| $r_6 = 102.2763$ | $d_6 = 1.3800$ | $A_6 = 10.242$ | $n_{d4} = 1.77250$ $\nu_{d4} = 49.66$ |
| $r_7 = 32.4147$ | $d_7 = 2.7568$ | $A_7 = 9.067$ | |
| $r_8 = -32.6678$ | $d_8 = 1.0000$ | $A_8 = 8.957$ | $n_{d5} = 1.80610$ $\nu_{d5} = 40.95$ |
| $r_9 = 30.7027$ | $d_9 = 1.2461$ | $A_9 = 8.597$ | |
| $r_{10} = 35.0644$ | $d_{10} = 4.2944$ | $A_{10} = 8.870$ | $n_{d6} = 1.80518$ $\nu_{d6} = 25.43$ |
| $r_{11} = -25.5520$ | $d_{11} = 1.0000$ | $A_{11} = 9.034$ | $n_{d7} = 1.79952$ $\nu_{d7} = 42.24$ |
| $r_{12} = 735.5813$ | $d_{12} = $ (Variable) | $A_{12} = 9.326$ | |
| $r_{13} = \infty$ (Stop) | $d_{13} = 1.0000$ | $A_{13} = 9.521$ | |
| $r_{14} = 29.4461$ | $d_{14} = 4.1909$ | $A_{14} = 10.099$ | $n_{d8} = 1.61800$ $\nu_{d8} = 63.38$ |
| $r_{15} = -56.9080$ | $d_{15} = 0.1500$ | $A_{15} = 10.072$ | |
| $r_{16} = 46.8329$ | $d_{16} = 2.5857$ | $A_{16} = 9.771$ | $n_{d9} = 1.48749$ $\nu_{d9} = 70.20$ |
| $r_{17} = -880.8594$ | $d_{17} = 0.1500$ | $A_{17} = 9.521$ | |
| $r_{18} = 26.2788$ | $d_{18} = 3.4747$ | $A_{18} = 9.053$ | $n_{d10} = 1.48749$ $\nu_{d10} = 70.20$ |
| $r_{19} = -104.1886$ | $d_{19} = 0.4296$ | $A_{19} = 8.610$ | |
| $r_{20} = -47.8546$ | $d_{20} = 1.0000$ | $A_{20} = 8.607$ | $n_{d11} = 1.84666$ $\nu_{d11} = 23.88$ |
| $r_{21} = 72.4424$ | $d_{21} = 1.0000$ | $A_{21} = 8.247$ | |
| $r_{22} = \infty$ | $d_{22} = 21.9943$ | $A_{22} = 11.000$ | $n_{d12} = 1.51633$ $\nu_{d12} = 64.15$ |
| $r_{23} = \infty$ | $d_{23} = 1.0100$ | $A_{23} = 11.000$ | |
| $r_{24} = 77.1194$ | $d_{24} = 5.9868$ | $A_{24} = 9.941$ | $n_{d13} = 1.59270$ $\nu_{d13} = 35.29$ |
| $r_{25} = -51.8724$ | $d_{25} = 1.0400$ | $A_{25} = 10.078$ | $n_{d14} = 1.80400$ $\nu_{d14} = 46.57$ |
| $R_{26} = -89.3567$ | $d_{26} = 4.4462$ | $A_{26} = 10.718$ | |
| $r_{27} = -14.0563$ | $d_{27} = 2.0305$ | $A_{27} = 10.738$ | $n_{d15} = 1.79952$ $\nu_{d15} = 42.24$ |
| $r_{28} = -41.5516$ | $d_{18} = $ (Variable) | $A_{28} = 13.430$ | |
| $r_{29} = 198.9021$ | $d_{29} = 5.8747$ | $A_{29} = 20.215$ | $n_{d16} = 1.48749$ $\nu_{d15} = 70.20$ |
| $r_{30} = -64.1801$ | | $A_{30} = 20.499$ | |

Zooming Spaces

| f | 36.0 | 69.0 | 131.0 |
|---|---|---|---|
| $d_5$ | 1.928 | 7.881 | 16.596 |

-continued

|  | | | |
|---|---|---|---|
| $d_{12}$ | 17.257 | 8.266 | 1.000 |
| $d_{28}$ | 1.000 | 13.886 | 29.268 |

$F_1 = 74.7$
$F_2 = -22.5$
$F_3 = 18.8$
$F_4 = 100.3$

EXAMPLE 2

$f = 36.0 \sim 69.0 \sim 131.0$
$F_{NO} = 4.6 \sim 5.2 \sim 5.84$
$\omega = 31.00° \sim 17.41° \sim 9.38°$

| | | | | |
|---|---|---|---|---|
| $r_1 = 456.8011$ | $d_1 = 1.8000$ | $A_1 = 17.431$ | $n_{d1} = 1.80518$ | $\nu_{d1} = 25.43$ |
| $r_2 = 59.0618$ | $d_2 = 5.4000$ | $A_2 = 16.188$ | $n_{d2} = 1.62280$ | $\nu_{d2} = 57.06$ |
| $r_3 = -85.2994$ | $d_3 = 0.1500$ | $A_3 = 15.612$ | | |
| $r_4 = 30.3327$ | $d_4 = 3.2000$ | $A_4 = 12.198$ | $n_{d3} = 1.48749$ | $\nu_{d3} = 70.20$ |
| $r_5 = 51.3541$ | $d_5 = $ (Variable) | $A_5 = 11.400$ | | |
| $r_6 = -356.0846$ | $d_6 = 1.3800$ | $A_6 = 10.810$ | $n_{d4} = 1.77250$ | $\nu_{d4} = 49.66$ |
| $r_7 = 30.1716$ | $d_7 = 3.0047$ | $A_7 = 9.538$ | | |
| $r_8 = -53.1657$ | $d_8 = 1.0000$ | $A_8 = 9.229$ | $n_{d5} = 1.80610$ | $\nu_{d5} = 40.95$ |
| $r_9 = 19.2104$ | $d_9 = 4.1115$ | $A_9 = 8.699$ | $n_{d6} = 1.84666$ | $\nu_{d6} = 23.88$ |
| $r_{10} = -74.8936$ | $d_{10} = 1.1862$ | $A_{10} = 8.854$ | | |
| $r_{11} = -23.8078$ | $d_{11} = 1.0000$ | $A_{11} = 8.854$ | $n_{d7} = 1.79952$ | $\nu_{d7} = 42.24$ |
| $r_{12} = -41.4109$ | $d_{12} = $ (Variable) | $A_{12} = 9.227$ | | |
| $r_{13} = \infty$ (Stop) | $d_{13} = 1.0000$ | $A_{13} = 9.677$ | | |
| $r_{14} = 25.9046$ (Aspheric) | $d_{14} = 4.3000$ | $A_{14} = 10.368$ | $n_{d8} = 1.60311$ | $\nu_{d8} = 60.70$ |
| $r_{15} = -39.5483$ | $d_{15} = 0.1500$ | $A_{15} = 10.342$ | | |
| $r_{16} = 31.9683$ | $d_{16} = 3.7120$ | $A_{16} = 9.652$ | $n_{d9} = 1.48749$ | $\nu_{d9} = 70.20$ |
| $r_{17} = -46.2491$ | $d_{17} = 0.5398$ | $A_{17} = 9.325$ | | |
| $r_{18} = -30.0094$ | $d_{18} = 1.0000$ | $A_{18} = 9.323$ | $n_{d10} = 1.84666$ | $\nu_{d10} = 23.88$ |
| $r_{19} = -327.0660$ | $d_{19} = 1.0000$ | $A_{19} = 9.103$ | | |
| $r_{20} = \infty$ | $d_{20} = 21.0000$ | $A_{20} = 10.500$ | $n_{d11} = 1.51633$ | $\nu_{d11} = 64.15$ |
| $r_{21} = \infty$ | $d_{21} = 1.000$ | $A_{21} = 10.500$ | | |
| $r_{22} = 96.8252$ | $d_{22} = 9.9255$ | $A_{22} = 9.670$ | $n_{d12} = 1.59270$ | $\nu_{d12} = 35.29$ |
| $r_{23} = -15.5755$ | $d_{23} = 1.1000$ | $A_{23} = 10.112$ | $n_{d13} = 1.80610$ | $\nu_{d13} = 40.95$ |
| $r_{24} = -61.6343$ | $d_{24} = 4.0168$ | $A_{24} = 10.742$ | | |
| $r_{25} = -14.4176$ | $d_{25} = 2.0300$ | $A_{25} = 10.762$ | $n_{d14} = 1.79952$ | $\nu_{d14} = 42.24$ |
| $r_{26} = -41.2565$ | $d_{26} = $ (Variable) | $A_{26} = 13.199$ | | |
| $r_{27} = -120.3833$ | $d_{27} = 4.6222$ | $A_{27} = 18.403$ | $n_{d15} = 1.48749$ | $\nu_{d15} = 70.20$ |
| $r_{28} = -42.7695$ | | $A_{28} = 18.898$ | | |

Zooming Spaces

| f | 36.0 | 69.0 | 131.0 |
|---|---|---|---|
| $d_5$ | 1.500 | 9.716 | 16.382 |
| $d_{12}$ | 16.606 | 7.738 | 1.000 |
| $d_{26}$ | 1.000 | 12.995 | 31.724 |

Aspherical Coefficients
14th surface $P = 1$
$A_4 = -0.43165 \times 10^{-5}$
$A_6 = 0.14391 \times 10^{-7}$
$A_8 = 0.86501 \times 10^{-11}$
$F_1 = 76.7$
$F_2 = -22.1$
$F_3 = 19.3$
$F_4 = 133.5$

EXAMPLE 3

$f = 36.0 \sim 68.7 \sim 131.0$
$F_{NO} = 4.6 \sim 5.3 \sim 5.84$
$\omega = 31.00° \sim 17.48° \sim 9.38°$

| | | | | |
|---|---|---|---|---|
| $r_1 = 247.9253$ | $d_1 = 1.8000$ | $A_1 = 16.757$ | $n_{d1} = 1.80518$ | $\nu_{d1} = 25.43$ |
| $r_2 = 64.8293$ | $d_2 = 1.5500$ | $A_2 = 15.661$ | | |
| $r_3 = 279.7489$ | $d_3 = 3.7000$ | $A_3 = 15.632$ | $n_{d2} = 1.60311$ | $\nu_{d2} = 60.70$ |
| $r_4 = -78.2893$ | $d_4 = 0.1500$ | $A_4 = 15.133$ | | |
| $r_5 = 29.7043$ | $d_5 = 3.2313$ | $A_5 = 12.282$ | $n_{d3} = 1.48749$ | $\nu_{d3} = 70.20$ |
| $r_6 = 84.2927$ | $d_6 = $ (Variable) | $A_6 = 11.320$ | | |
| $r_7 = -401.7589$ | $d_7 = 1.3800$ | $A_7 = 10.726$ | $n_{d4} = 1.77250$ | $\nu_{d4} = 49.66$ |
| $r_8 = 21.1263$ | $d_8 = 3.2000$ | $A_8 = 9.294$ | | |
| $r_9 = -81.3436$ | $d_9 = 1.1000$ | $A_9 = 9.137$ | $n_{d5} = 1.77250$ | $\nu_{d5} = 49.66$ |
| $r_{10} = 130.7502$ | $d_{10} = 0.1500$ | $A_{10} = 9.128$ | | |
| $r_{11} = 31.4419$ | $d_{11} = 3.8000$ | $A_{11} = 9.671$ | $n_{d6} = 1.80518$ | $\nu_{d6} = 25.43$ |
| $r_{12} = -49.8123$ | $d_{12} = 1.0000$ | $A_{12} = 9.736$ | | |
| $r_{13} = -30.5394$ | $d_{13} = 1.0000$ | $A_{13} = 9.709$ | $n_{d7} = 1.80610$ | $\nu_{d7} = 40.95$ |
| $r_{14} = 479.7419$ | $d_{14} = $ (Variable) | $A_{14} = 10.013$ | | |

-continued

| | | | | |
|---|---|---|---|---|
| $r_{15} = \infty$ (Stop) | $d_{15} = 1.0000$ | $A_{15} = 10.208$ | | |
| $r_{16} = 23.4154$ (Aspheric) | $d_{16} = 5.0000$ | $A_{15} = 10.993$ | $n_{d8} = 1.60311$ | $v_{d8} = 60.70$ |
| $r_{17} = -53.3260$ | $d_{17} = 0.1500$ | $A_{17} = 10.927$ | | |
| $r_{18} = 40.9594$ | $d_{18} = 4.4000$ | $A_{18} = 10.353$ | $n_{d9} = 1.48749$ | $v_{d9} = 70.20$ |
| $r_{19} = -33.4096$ | $d_{19} = 0.5000$ | $A_{19} = 9.994$ | | |
| $r_{20} = -30.4882$ | $d_{20} = 1.1000$ | $A_{20} = 9.724$ | $n_{d10} = 1.84666$ | $v_{d10} = 23.88$ |
| $r_{21} = -581.3461$ | $d_{21} = 1.0000$ | $A_{21} = 9.448$ | | |
| $r_{22} = \infty$ | $d_{22} = 21.0000$ | $A_{22} = 10.500$ | $n_{d11} = 1.51633$ | $v_{d11} = 64.15$ |
| $r_{23} = \infty$ | $d_{23} = 1.0000$ | $A_{23} = 10.500$ | | |
| $r_{24} = 44.3813$ | $d_{24} = 3.0000$ | $A_{24} = 9.693$ | $n_{d12} = 1.59270$ | $v_{d12} = 35.29$ |
| $r_{25} = -136.0514$ | $d_{25} = 4.6500$ | $A_{25} = 9.755$ | | |
| $r_{26} = -14.2955$ (Aspheric) | $d_{26} = 2.0000$ | $A_{26} = 9.786$ | $n_{d13} = 1.77250$ | $v_{d13} = 49.66$ |
| $r_{27} = -171.5013$ | $d_{27} =$ (Variable) | $A_{27} = 11.877$ | | |
| $r_{28} = -143.2098$ | $d_{28} = 5.0000$ | $A_{28} = 18.673$ | $n_{d14} = 1.48749$ | $v_{d14} = 70.20$ |
| $r_{29} = -41.9340$ | | $A_{29} = 19.101$ | | |

Zooming Spaces

| f | 36.0 | 68.7 | 131.0 |
|---|---|---|---|
| $d_6$ | 1.500 | 10.878 | 17.391 |
| $d_{14}$ | 17.750 | 8.155 | 1.000 |
| $d_{27}$ | 1.500 | 14.274 | 36.213 |

Aspherical Coefficients

16th surface

P = 1
$A_4 = -0.89919 \times 10^{-5}$
$A_6 = -0.55381 \times 10^{-8}$
$A_8 = -0.16667 \times 10^{-10}$ 26th surface P = 1
$A_4 = -0.54250 \times 10^{-5}$
$A_6 = 0.58051 \times 10^{-8}$
$A_8 = 0.47074 \times 10^{-9}$
$F_1 = 82.7$
$F_2 = -24.4$
$F_3 = 21.0$
$F_4 = 119.7$

EXAMPLE 4

$f = 36.0 \sim 68.7 \sim 131.0$
$F_{NO} = 4.6 \sim 5.2 \sim 5.84$
$\omega = 31.00° \sim 17.48° \sim 9.38°$
$f_B = 4.135 \sim 24.866 \sim 60.525$

| | | | | |
|---|---|---|---|---|
| $r_1 = -114.2091$ | $d_1 = 2.0000$ | $A_1 = 18.515$ | $n_{d1} = 1.85026$ | $v_{d1} = 32.28$ |
| $r_2 = 63.9089$ | $d_2 = 0.8000$ | $A_2 = 18.025$ | | |
| $R_3 = 84.6378$ | $d_3 = 5.0000$ | $A_3 = 18.040$ | $n_{d2} = 1.60311$ | $v_{d2} = 60.70$ |
| $r_4 = -100.8314$ | $d_4 = 0.1000$ | $A_4 = 18.013$ | | |
| $r_5 = 48.3639$ | $d_5 = 5.0000$ | $A_5 = 17.306$ | $n_{d3} = 1.58900$ | $v_{d3} = 48.61$ |
| $r_6 = -148.2980$ | $d_6 =$ (Variable) | $A_6 = 17.121$ | | |
| $r_7 = -81.8877$ | $d_7 = 1.2000$ | $A_7 = 10.947$ | $n_{d4} = 1.77250$ | $v_{d4} = 49.66$ |
| $r_8 = 22.9828$ | $d_8 = 1.6657$ | $A_8 = 9.741$ | | |
| $r_9 = 32.4022$ | $d_9 = 3.6565$ | $A_9 = 9.592$ | $n_{d5} = 1.84666$ | $v_{d5} = 23.78$ |
| $r_{10} = -89.3354$ | $d_{10} = 1.0000$ | $A_{10} = 9.163$ | | |
| $r_{11} = \infty$ | $d_{11} = 22.0000$ | $A_{11} = 11.000$ | $n_{d6} = 1.51633$ | $v_{d6} = 64.15$ |
| $r_{12} = \infty$ | $d_{12} = 1.0000$ | $A_{12} = 11.000$ | | |
| $r_{13} = \infty$ (Stop) | $d_{13} = 1.0000$ | $A_{13} = 8.656$ | | |
| $r_{14} = 131.6856$ | $d_{14} = 4.0000$ | $A_{14} = 8.663$ | $n_{d7} = 1.58913$ | $v_{d7} = 61.18$ |
| $r_{15} = -25.7432$ | $d_{15} = 1.0000$ | $A_{15} = 8.615$ | | |
| $r_{16} = -20.3621$ | $d_{16} = 1.2000$ | $A_{16} = 8.444$ | $n_{d8} = 1.84666$ | $v_{d8} = 23.88$ |
| $r_{17} = 805.0231$ | $d_{17} = 0.8833$ | $A_{17} = 8.769$ | | |
| $r_{18} = -194.0070$ | $d_{18} = 3.4653$ | $A_{18} = 8.918$ | $n_{d9} = 1.66672$ | $v_{d9} = 48.32$ |
| $r_{19} = -26.3769$ | $d_{19} = 0.1000$ | $A_{19} = 9.234$ | | |
| $r_{20} = 110.5014$ | $d_{20} = 3.6512$ | $A_{20} = 9.275$ | $n_{d10} = 1.60729$ | $v_{d10} = 49.19$ |
| $r_{21} = -36.8936$ | $d_{21} =$ (Variable) | $A_{21} = 9.254$ | | |
| $r_{22} = -157.6511$ | $d_{22} = 3.6687$ | $A_{22} = 13.259$ | $n_{d11} = 1.78472$ | $v_{d11} = 25.68$ |
| $r_{23} = -34.5020$ | $d_{23} = 0.1000$ | $A_{23} = 13.489$ | | |
| $r_{24} = -80.3909$ | $d_{24} = 1.8395$ | $A_{24} = 13.402$ | $n_{d12} = 1.73400$ | $v_{d12} = 51.49$ |
| $r_{25} = 100.9734$ | $d_{25} = 7.0000$ | $A_{25} = 13.566$ | | |
| $r_{26} = -19.3945$ | $d_{26} = 2.0501$ | $A_{26} = 13.650$ | $n_{d13} = 1.77250$ | $v_{d13} = 49.66$ |
| $r_{27} = -176.3621$ | | $A_{27} = 16.991$ | | |

Zooming Spaces

| f | 36.0 | 68.7 | 131.0 |
|---|---|---|---|
| $d_6$ | 2.700 | 20.015 | 32.197 |
| $d_{21}$ | 20.391 | 8.900 | 0.682 |

$F_1 = 100.0$
$F_2 = 32.0$

-continued $F_3 = -30.0$

EXAMPLE 5

$f = 36.0 \sim 68.7 \sim 131.0$
$F_{NO} = 4.6 \sim 5.2 \sim 5.84$
$\omega = 31.00° \sim 17.48° \sim 9.38°$
$f_B = 4.196 \sim 24.720 \sim 60.682$

| | | | | |
|---|---|---|---|---|
| $r_1 = -114.2995$ | $d_1 = 2.3510$ | $A_1 = 17.856$ | $n_{d1} = 1.83400$ | $\nu_{d1} = 37.16$ |
| $r_2 = 59.1085$ | $d_2 = 2.6106$ | $A_2 = 17.313$ | | |
| $r_3 = 61.3886$ | $d_3 = 5.0000$ | $A_3 = 17.640$ | $n_{d2} = 1.60311$ | $\nu_{d2} = 60.70$ |
| $r_4 = -105.1551$ | $d_4 = 0.1804$ | $A_4 = 17.606$ | | |
| $r_5 = 68.3659$ | $d_5 = 5.0000$ | $A_5 = 17.090$ | $n_{d3} = 1.58913$ | $\nu_{d3} = 61.18$ |
| $r_6 = -212.4572$ | $d_6 =$ (Variable) | $A_6 = 16.853$ | | |
| $r_7 = -120.4624$ | $d_7 = 1.2000$ | $A_7 = 10.908$ | $n_{d4} = 1.77250$ | $\nu_{d4} = 49.66$ |
| $r_8 = 24.6473$ | $d_8 = 0.5000$ | $A_8 = 9.836$ | | |
| $r_9 = 25.6237$ | $d_9 = 3.7799$ | $A_9 = 9.767$ | $n_{d5} = 1.84666$ | $\nu_{d5} = 23.78$ |
| $r_{10} = 149.7744$ | $d_{10} = 1.0000$ | $A_{10} = 9.204$ | | |
| $r_{11} = \infty$ | $d_{11} = 22.0000$ | $A_{11} = 9.146$ | $n_{d6} = 1.51633$ | $\nu_{d6} = 64.15$ |
| $r_{12} = \infty$ | $d_{12} = 1.0000$ | $A_{12} = 9.032$ | | |
| $r_{13} = \infty$ (Stop) | $d_{13} = 3.000$ | $A_{13} = 9.032$ | | |
| $r_{14} = 35.6829$ | $d_{14} = 3.0000$ | $A_{14} = 9.032$ | $n_{d7} = 1.58913$ | $\nu_{d7} = 61.18$ |
| $r_{15} = -52.6212$ | $d_{14} = 1.0000$ | $A_{15} = 8.929$ | | |
| $r_{16} = -23.1055$ | $d_{16} = 1.5000$ | $A_{15} = 8.938$ | $n_{d8} = 1.84666$ | $\nu_{d8} = 23.88$ |
| $r_{17} = -79.9297$ | $d_{17} = 2.9179$ | $A_{17} = 9.104$ | | |
| $r_{18} = -532.7957$ | $d_{18} = 1.50000$ | $A_{18} = 9.148$ | $n_{d9} = 1.84666$ | $\nu_{d9} = 23.88$ |
| $r_{19} = 57.0737$ | $d_{19} = 1.0000$ | $A_{19} = 9.183$ | | |
| $r_{20} = -224.2628$ | $d_{20} = 2.5575$ | $A_{20} = 9.195$ | $n_{d10} = 1.66672$ | $\nu_{d10} = 48.32$ |
| $r_{21} = -31.2066$ | $d_{21} = 0.1000$ | $A_{21} = 9.572$ | | |
| $r_{22} = 82.3983$ | $d_{22} = 3.5000$ | $A_{22} = 10.261$ | $n_{d11} = 1.60729$ | $\nu_{d11} = 49.19$ |
| $r_{23} = -32.2539$ | $d_{23} =$ (Variable) | $A_{23} = 10.412$ | | |
| $r_{24} = -208.5758$ | $d_{24} = 4.5000$ | $A_{24} = 13.402$ | $n_{d12} = 1.80518$ | $\nu_{d12} = 25.43$ |
| $r_{25} = -33.5853$ | $d_{25} = 0.1000$ | $A_{25} = 13.675$ | | |
| $r_{26} = -62.7615$ | $d_{26} = 1.8803$ | $A_{26} = 13.500$ | $n_{d13} = 1.77250$ | $\nu_{d13} = 49.66$ |
| $r_{27} = 111.4715$ | $d_{27} = 6.8745$ | $A_{27} = 13.639$ | | |
| $r_{28} = -19.7307$ | $d_{28} = 2.0501$ | $A_{28} = 13.716$ | $n_{d14} = 1.77250$ | $\nu_{d14} = 49.66$ |
| $r_{29} = -340.4524$ | | $A_{29} = 17.074$ | | |

Zooming Spaces

| f | 36.0 | 68.7 | 131.0 |
|---|---|---|---|
| $d_6$ | 1.200 | 22.400 | 37.060 |
| $d_{29}$ | 18.886 | 8.444 | 1.253 |

$F_2 = 129.2$
$F_2 = 32.4$
$F_3 = -28.2$

As can be appreciated from the foregoing, the invention successfully provides a compact zoom lens system which makes a parallax-free TTL finder possible and, when used on a 35-mm silver salt camera, is no more than about 100 mm in the shortest overall length, although it has a zoom ratio of 3.5 or more, a longest focal length of about 135 mm and an F-number of about 5.6.

What we claim is:

1. A compact zoom lens system comprising:
   a first lens unit located on a side proximate to an object and having a positive power as a whole,
   a reflective means located more closely to an image side than said first lens unit and disposed for guiding a part of light passing through said first lens unit to a finder subsystem,
   a front sub-lens unit located more closely to the image side than said first lens unit and on the object side of said reflective means, and
   a rear sub-lens unit located more closely to the image side than said reflective means,
   (a) said front sub-lens unit having a positive power as a whole and said rear sub-lens unit having a negative power as a whole, or alternatively said front sub-lens unit having a negative power as a whole and said rear sub-lens unit having a positive power as a whole,
   (b) said front sub-lens unit and said rear sub-lens unit forming a movable lens unit that moves for zooming, and said front sub-lens unit, said reflective means and said rear sub-lens unit moving on the optical axis from the wide angle to telephoto end, and
   (c) said movable lens unit having an aperture stop therein or adjacent thereto.

2. A compact zoom lens system comprising:
   a first lens unit located on a side proximate to an object and having a positive power as a whole,
   a reflective means located more closely to an image side than said first lens unit and disposed for guiding a part of light passing through said first lens unit to a finder subsystem,
   a front sub-lens unit located more closely to the image side than said first lens unit and on the object side of said reflective means, and
   a rear sub-lens unit located more closely to the image side than said reflective means,
   (a) said front sub-lens unit having a positive power as a whole and said rear sub-lens unit having a negative power as a whole, or alternatively said front sub-lens unit having a negative power as a whole and said rear sub-lens unit having a positive power as a whole, (b) said front sub-lens unit and said rear sub-lens unit forming a movable lens unit that moves for zooming, and said front sub-lens unit, said reflective means and said rear sub-lens unit moving as an integral piece for wide angle to telephoto zooming, and (c) said movable lens unit having an aperture stop therein or adjacent thereto.

3. A compact zoom lens system as claimed in claim 1 or 2, which at least includes, in order from the object side, said first lens unit of positive power, a second lens unit of negative power and a third lens unit of positive power and is disposed such that at least said third lens unit is moved from the image side to object side for wide angle to telephoto zooming, said third lens unit being divided into a positive, front sub-lens unit and a negative, rear sub-lens unit in order from the object side, between which there is located a reflective means for guiding light incident on said zoom lens system to a finder subsystem, and said third lens unit having an aperture stop located therein or adjacent thereto.

4. A compact zoom lens system as claimed in claim 1 or 2, which at least includes, in order from the object side, said first lens unit of positive power, a second lens unit of positive power and a third lens unit of negative power and is disposed such that at least said second lens unit is moved from the image side to object side for wide angle to telephoto zooming, said second lens unit being divided into a negative, front sub-lens unit and a positive, rear sub-lens unit in order from the object side, between which there is located a reflective means for guiding light incident on said zoom lens system to a finder subsystem, and said second lens unit having an aperture stop located therein or adjacent thereto.

5. A compact zoom lens system as claimed in claim 1 or 2, which conforms to the following conditions (1) and (2):

$$0.8 < F_T/F_1 < 2.5 \tag{1}$$

and $$4 < F_T/F_R < 8 \tag{2}$$

where $F_T$ is the longest focal length of the zoom lens system, $F_R$ is the focal length of the movable unit including the reflective means, and $F_1$ is the focal length of the first lens unit.

6. A compact zoom lens as claimed in claim 3, which conforms to the following conditions (3) and (4):

$$4 < F_T/F_{RP1} < 8 \tag{3}$$

and $$-7 < F_T/F_{RN1} < -3 \tag{4}$$

where $F_{RP1}$ is the focal length of the positive sub-unit in the third lens unit, and $F_{RN1}$ is the focal length of the negative sub-unit in the third lens unit.

7. A compact zoom lens system as claimed in claim 5, which conforms to the following conditions (5), (6) and (7):

$$0.5 < |F_T/F_{RN2}| < 2 \tag{5}$$

$$3 < F_T/F_{RP2} < 5 \tag{6}$$

and $$-7 < F_T/F_3 < -3 \tag{7}$$

where $F_{RN2}$ is the focal length of the negative sub-unit in the second lens unit, $F_{RP2}$ is the focal length of the positive sub-unit in the second lens unit, and $F_3$ is the focal length of the third lens unit.

* * * * *